United States Patent [19]

Lanz et al.

[11] 4,118,995
[45] Oct. 10, 1978

[54] INTEGRAL TIE STRAP AND RIVET ASSEMBLIES FOR SAW CHAINS

[75] Inventors: Donald D. Lanz; Ronald E. Hencye, both of Oregon City, Oreg.

[73] Assignee: Omark Industries, Inc., Portland, Oreg.

[21] Appl. No.: 786,095

[22] Filed: Apr. 11, 1977

Related U.S. Application Data

[60] Division of Ser. No. 733,258, Oct. 18, 1976, Pat. No. 4,037,403, which is a continuation-in-part of Ser. No. 613,168, Sep. 15, 1975, abandoned.

[51] Int. Cl.² .............................................. F16G 13/04
[52] U.S. Cl. ...................... 74/245 S; 59/78; 74/250 S; 83/831
[58] Field of Search .................. 74/252, 248, 250 R, 74/250 S, 251 R, 251 S, 245 S; 76/112; 59/5, 6, 10, 12, 35, 78; 83/830, 831

[56] References Cited

U.S. PATENT DOCUMENTS

| 2,749,950 | 6/1956 | Jamieson | 83/831 |
| 2,798,381 | 7/1957 | Siverson | 74/252 |
| 3,421,313 | 1/1969 | Harada | 59/78 |

FOREIGN PATENT DOCUMENTS

| 235,667 | 1/1964 | Australia | 83/831 |
| 609,963 | 5/1926 | France | 59/5 |
| 3,135 of | 1899 | United Kingdom | 59/6 |

Primary Examiner—Lowell A. Larson
Assistant Examiner—Gene P. Crosby
Attorney, Agent, or Firm—Robert L. Harrington

[57] ABSTRACT

Integrated tie strap and rivet assemblies for saw chains are made by the steps of rough cutting, coning, coining and trimming a length of elongate bar. The integrated tie strap and rivet assemblies thus formed replace the separate tie straps, rivets and concentric shoulders heretofore used in saw chains.

1 Claim, 9 Drawing Figures

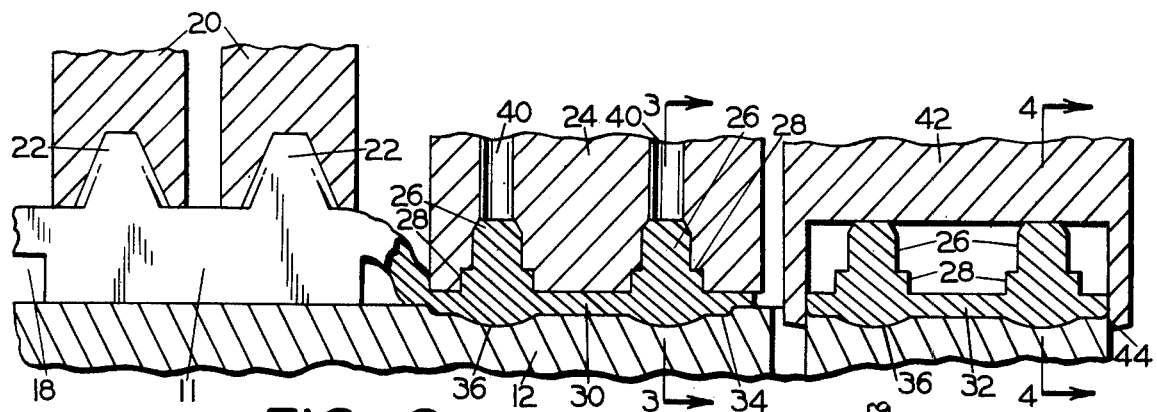
FIG. 2
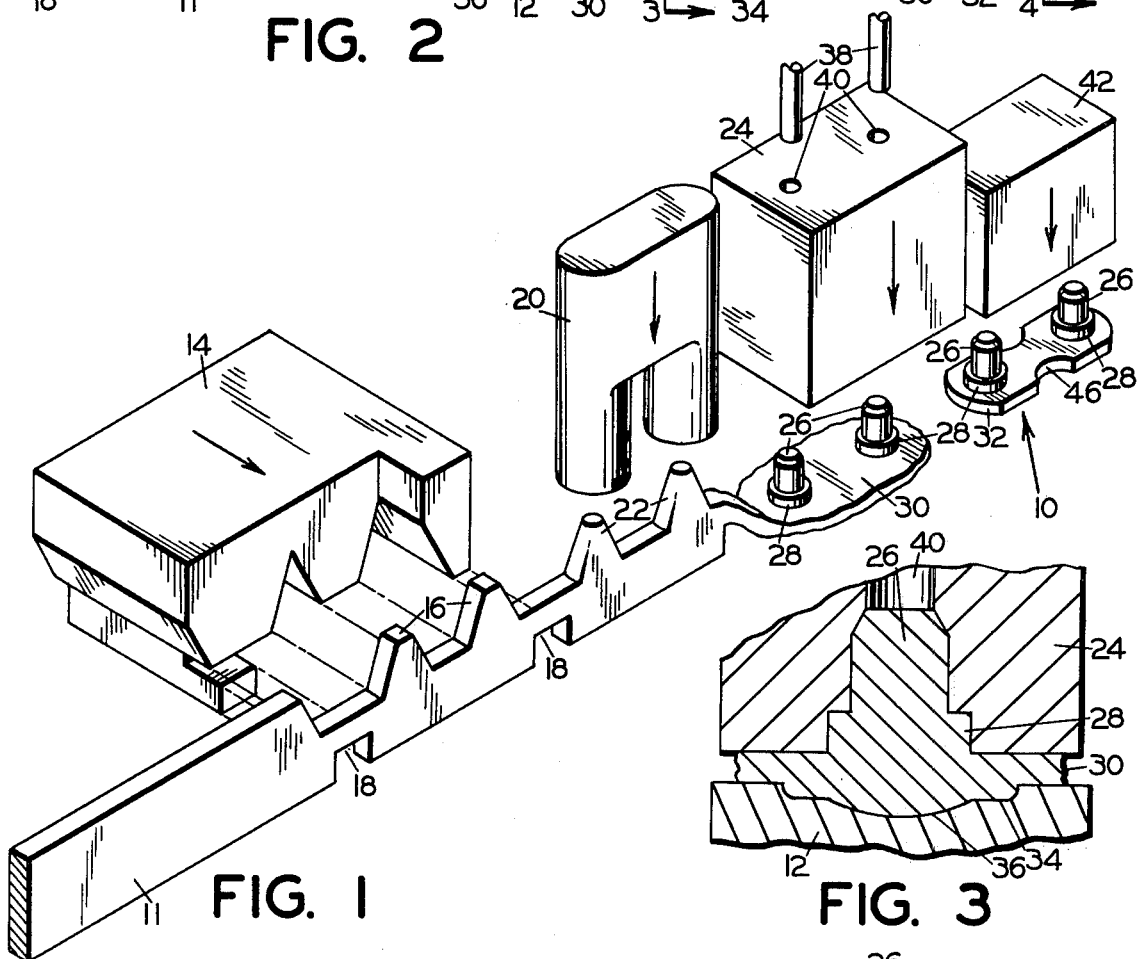
FIG. 1
FIG. 3
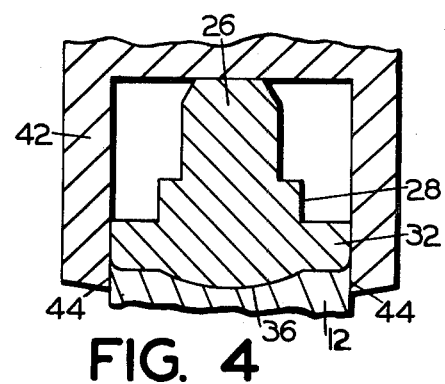
FIG. 4

INTEGRAL TIE STRAP AND RIVET ASSEMBLIES FOR SAW CHAINS

This is a division of application Ser. No. 733,258, filed Oct. 18, 1976, now U.S. Pat. No. 4,037,403, which is a continuation-in-part of Ser. No. 613,168, filed Sept. 15, 1975, now abandoned.

BACKGROUND OF THE INVENTION

This invention relates to tie straps and associated rivets used in saw chains. It pertains particularly to a method of making these tie straps and rivets as an integrated assembly.

Saw chains, in general, comprise alternating right hand and left hand cutters separated by blank links. The cutters and blank links are fastened to one another by rivets with concentric shoulders providing separation between opposed tie straps or tie straps and cutters. This allows the elements to rotate at the riveted joints. The blank links comprise paired opposed tie straps joined by rivets. The cutters are opposed by tie straps and joined by the rivets.

In the past, separate rivets and concentric shoulders have been hand assembled, inserted into the tie straps and cutters, and the rivets spun to form heads. Presently the assembly is done by machine, but due to the small size of the parts, automation is difficult.

In order to facilitate automated assembly and reduce the cost of the chains, the holes in the cutters and tie straps into which the rivets are installed are made considerably larger than the rivets. The resulting chain is therefore not dimensionally uniform and is loose fitting even when new. Accordingly, the general object of the present invention is to provide tie straps and rivets for saw chains in an integrated assembly.

It is a further object of the present invention to provide such integrated assemblies wherein concentric shoulders are formed into the rivets to thereby achieve with a single element the features of a tie strap, a rivet for attaching same to an opposite tie strap, and an intermediate shoulder that spaces the tie straps and provides a bearing surface for free pivoting of the intermediate center link.

It is a further object of the present invention to provide a method wherein the assembly is formed in one piece without any hand installation of parts.

It is a further object of the present invention to provide such a method wherein the assembly is precision formed having uniform rivet spacing for accurate alignment on the saw chain.

It is a further object of the present invention to provide such a method which is capable of mass producing the assemblies at a low cost.

It is a further object of the present invention to provide such a method wherein the tie straps are formed with medial cutouts and inwardly angled edges on each side, and thus can be used for either right hand or left hand application.

THE DRAWINGS

The manner in which the foregoing and other objects of the invention are accomplished will be apparent from the accompanying specification and claims, considered together with the drawings wherein:

FIG. 1 is a diagrammatic pictorial view showing the steps employed in the method of the present invention;

FIG. 2 is a diagrammatic view, in side elevation, partially broken away, showing some of the steps employed in the method of the present invention;

FIG. 3 is a fragmentary sectional view, in side elevation, of one step of the method taken along line 3—3 of FIG. 2;

FIG. 4 is a fragmentary sectional view, in side elevation, of one step of the method taken along line 4—4 of FIG. 2;

GENERAL STATEMENT OF THE INVENTION

Figure 5:
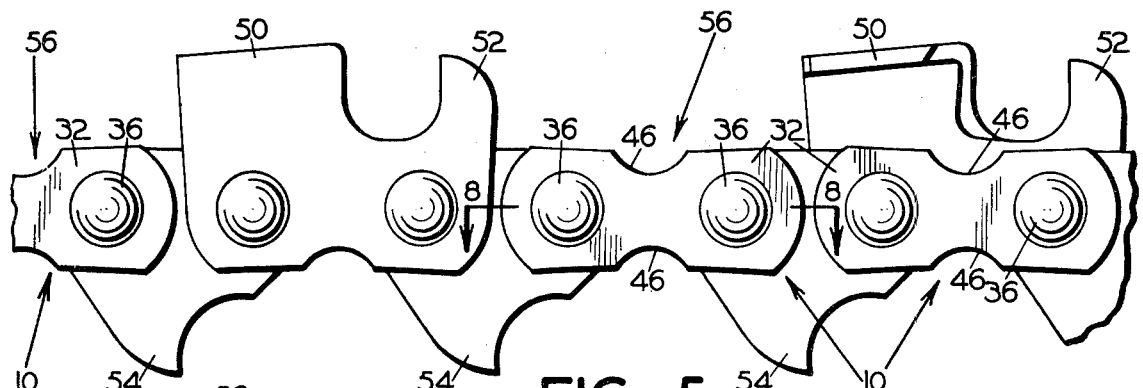
FIG. 5 is a fragmentary view, in side elevation, of a saw chain showing the installation of the integrated tie strap and rivet assemblies formed by the method of FIGS. 1 through 4.

The method of the present invention generally comprises providing an elongate bar and supporting it in a longitudinal orientation. The elongate bar is first rough cut to form trapezoidal blanks on its upper portion. Next, the trapezoidal blanks are coned to form partial frustro-conic protrusions. The elongate bar is then coined to form rivets and concentric shoulders from the partial frustro-conic protrusions, and flat bases from the remainder of the elongate bar. Finally, the flat bases are trimmed to form tie straps.

The method is utilized to make integrated tie strap and rivet assemblies for saw chains. The integrated assemblies then are used to replace separate tie straps, rivets, and concentric shoulders.

DETAILED DESCRIPTION OF A PREFERRED EMBODIMENT

FIG. 1 diagrammatically shows the several steps of the method of the present invention. The method generally comprises rough cutting, coning, coining and trimming a length of elongate bar to form integrated tie strap and rivet assemblies 10 for saw chains.

Elongate bar 11 is provided and supported by conventional feed means (not shown) which transports it through the process. In this case the feed means must be configured to prevent lateral movement of the elongate bar. Conventional indexing means (not shown) aligns the elongate bar in the proper location for execution of each step of the method. Anvil 12 provides bottom support for the bar.

The first step of the method is executed by a cutting tool 14 which rough cuts the top portion of elongate bar 11 into paired trapezoidal blanks 16. The paired trapezoidal blanks are separated by a distance equal to that desired for the spacing of the rivets on the finished tie strap and rivet assemblies. This distance is normally standard in the saw chain field.

The cutting tool may simultaneously notch the bottom portion of elongate bar 11 to form relief slot 18. The relief slot is positioned between each adjacent pair of trapezoidal blanks 16 and marks the point of separation between each successive tie strap and rivet assembly.

The type of cutting tool utilized in this step is not particularly important. Many types of cutting tools, such as a milling cutter, broach, or die cutter, would suffice. The selected tool need only be capable of making a quick, rough cut as the resulting trapezoidal blanks are refined into their ultimate shapes at downstream stations.

The next step of the method comprises coning the trapezoidal blanks with a vertical stamping tool 20. The trapezoidal blanks are formed into partial frustro-conic protrusions 22 in this step.

The frustro-conic protrusions are not completely conic as the side portions remain flat. The resulting upper surfaces, however, are completely circular. The coning step does not alter the remaining portion of the elongate bar.

Press 24 is used in the next step further to form the tie strap and rivet assemblies. The frusto-conic protrusions are formed into finished rivets 28 and concentric shoulders 28 in this step. Press 24 also forms flat bases 30 from the remaining portion of elongate bar. The flat bases are approximately the same thickness as the finished tie straps 32 which are formed from them, but are longer and wider.

Anvil 12 may contain a recess to rough trim the flat bases during the coining step. This serves the purpose of forming the rounded edges 34. If the tie straps are completely formed in the trimming step, sharp edges will result, necessitating further grinding or tumbling to remove burrs and provide smooth tie straps.

The anvil also may contain indentations beneath each of the rivets to form dummy heads 36 on the back sides of the tie straps. The dummy heads replace the rivet heads found on normal saw chain links, and give the finished links the symmetry required for proper balance and cutting action.

As shown in FIGS. 1 and 2, flat bases 30 are depressed during the coining step. Relief slots 18 allow for this depression and for expansion during the coining step. The relief slots also provide the separation points between adjacent tie plates.

To aid in removal of the just-formed rivets from press 24, ejector pins 33 fit into cylinders 40 in the press. Cylinders 40 are positioned above rivets 26 so that when the ejector pins are inserted into the cylinders, they contact the rivets and push them out of the press. Ejector pins are required in this step since the vertical sides of the rivets which are normal to the flat bases 30, and concentric shoulders do not allow for easy removal from the press.

The final step of the method of the present invention is trimming the flat plates to form tie straps 32 and thus complete the making of the integrated tie strap and rivet assemblies 10. Die 42 cooperates with edge 44 of the anvil to perform this operation. In order to provide socket clearance on the resulting links, notches 46 are formed in each side of the tie straps.

Figure 9:
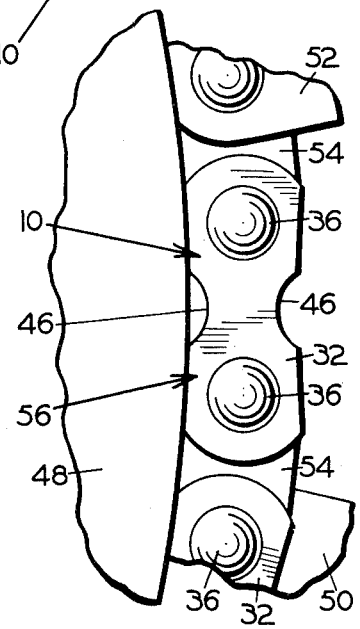
FIG. 9 is a fragmentary view, in side elevation, of the saw chain of FIG. 1 installed on the saw.

The die is also configured to provide inwardly angled sides on the tie straps. As shown in FIG. 9, angled sides mate better with saw bar guide 48. It will be noted that the tie straps formed by the present method are completely symmetrical.

Figure 6:
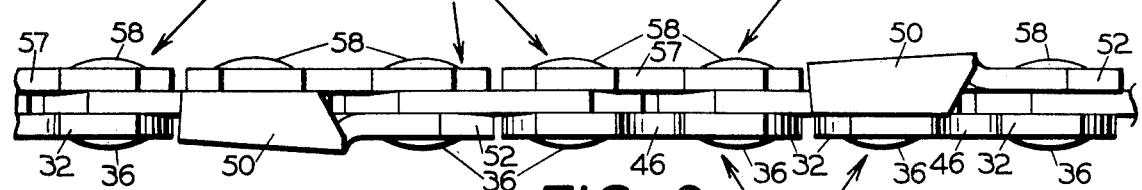
FIG. 6 is a fragmentary view, in plan, of the saw chain of FIG. 5.
Figure 7:
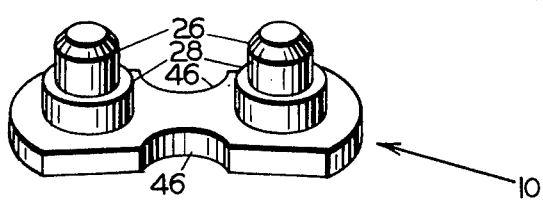
FIG. 7 is a top perspective view of the integrated tie strap and rivet assemblies in accordance with the present invention.

Referring to FIGS. 5 and 6, a typical saw chain comprises cutters 50 with integral depth gauges 52 and drive links 54, all joined in a continuous chain by the integrated tie strap and rivet assemblies of the invention. The cutters are placed alternately on the left and right sides of the chain, and are separated from the adjacent cutters by blank links 56. Blank links 56 comprise integrated tie strap and rivet assemblies 10 and blank tie straps 57. Drive links 54 join the blank links to cutters 50.

Figure 8:
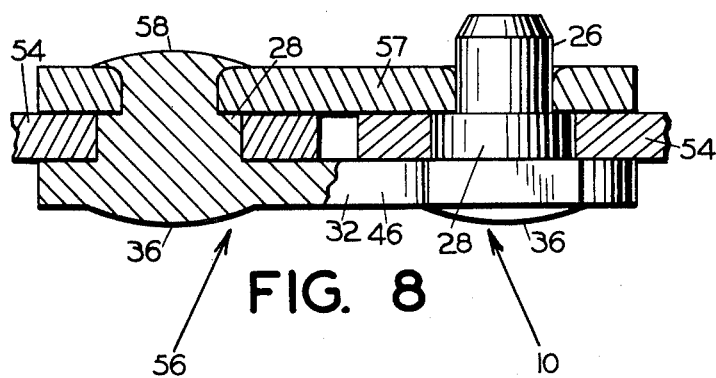
FIG. 8 is a fragmentary view, is side elevation, partially broken away, showing the installation of the tie strap and rivet assemblies.

The chain is assembled by placing the rivets of the integrated tie strap and rivet assemblies through drive links 54, as shown in FIG. 8, and placing either cutters 50 or blank tie straps 57 on the other side. The drive links are thus sandwiched in between with a separate drive link carried by each rivet.

The rivets are then spun by the standard method to form heads 58 permanently joining the elements. Concentric shoulders 28 provide a small amount of clearance between the integrated tie strap and rivet assemblies and their associated cutters or blank tie straps and also provide the bearing surface to allow the elements to pivot. The integrated tie strap and rivet assemblies may be backed by either cutters or blank tie straps, and are used in each riveted joint on the saw chain.

It will be noted that saw chain fabrication is facilitated by the use of the integrated tie strap and rivet assemblies, since the rivets need be spun only on one side rather than on both sides as is required with standard rivets. Furthermore, since the rivets are integrated with the straps, the small rivets and concentric shoulders, normally installed as separate elements, do not have to be mated and individually inserted.

Finally, the integrated assemblies are dimensionally uniform resulting in a closer tolerance saw chain than is possible with separate tie straps and rivets.

Having thus described my invention in a specific embodiment, I claim:

1. A saw chain assembly comprising: a repetitive sequence of a center link pivotally connected to a pair of side links, a solid cylindrical postlike protrusion having inner and outer end cylindrical portions extended from one of said side links and extended through the center link and then the other side link, said cylindrical postlike protrusion being extruded metal formed from the side link material to provide integral attachment thereto, said cylindrical postlike protrusion having its inner cylindrical portion forming a cylindrical being surface normal to the side link and being relatively larger in diameter than the outer cylindrical end portion, said inner cylindrical bearing portion nested within and extended through the aligned opening of the center link and providing the bearing surface on which the center link is pivoted, and the outer cylindrical end portion forming a shoulder with said inner cylindrical bearing portion and protruded through the aligned opening on the other side link with the protruded end headed to prevent removal, said opening of the other side link being smaller in diameter than the diameter of the cylindrical inner bearing portion of the protrusion and the other side link being abuted against the shoulder so that the length of said inner bearing portion establishes a spacing between the pair of side links, the length of the inner bearing portion being greater than the center link thickness and said spacing and said inner bearing surface normal to the side link thereby providing free pivoting of the center link relative to the side links.

* * * * *